United States Patent [19]

Jasuja et al.

[11] Patent Number: 5,845,296
[45] Date of Patent: Dec. 1, 1998

[54] METHOD AND APPARATUS FOR IMPLEMENTING SEGMENTED ARRAYS IN A DATABASE

[75] Inventors: Amit Jasuja, Belmont; Roger Taranto, Berkeley; Juan Loaiza, San Carlos; Gianfranco Putzolu, San Francisco, all of Calif.

[73] Assignee: Oracle Corporation, Redwood Shores, Calif.

[21] Appl. No.: 677,771

[22] Filed: Jul. 10, 1996

[51] Int. Cl.⁶ .................................................. G06F 17/30
[52] U.S. Cl. ............................ 707/205; 707/205; 707/1; 707/2; 707/3; 707/100; 707/101; 707/102; 707/103; 707/104; 707/200
[58] Field of Search .................................. 707/2, 103, 3, 707/1, 101, 100, 102, 104, 200, 205; 705/2, 4; 395/677, 705

[56] References Cited

U.S. PATENT DOCUMENTS

| | | | |
|---|---|---|---|
| 3,938,096 | 2/1976 | Brown et al. | 711/209 |
| 4,096,568 | 6/1978 | Bennett et al. | 364/200 |
| 4,672,535 | 6/1987 | Katzman et al. | 364/200 |
| 4,864,497 | 9/1989 | Lowry et al. | 707/102 |
| 5,119,291 | 6/1992 | Flannagan et al. | 707/200 |
| 5,345,588 | 9/1994 | Greenwood et al. | 395/677 |
| 5,392,448 | 2/1995 | Frankel et al. | 395/800.35 |
| 5,555,505 | 9/1996 | Oosawa et al. | 707/104 |
| 5,603,030 | 2/1997 | Gray et al. | 395/705 |
| 5,634,050 | 5/1997 | Krueger et al. | 707/200 |
| 5,655,085 | 8/1997 | Ryan et al. | 705/4 |
| 5,664,177 | 9/1997 | Lowry | 707/100 |
| 5,692,147 | 11/1997 | Larsen et al. | 711/202 |
| 5,699,460 | 12/1997 | Kopet et al. | 382/307 |
| 5,712,989 | 1/1998 | Johnson et al. | 235/385 |

OTHER PUBLICATIONS

Efficient Algotithms for Resource Allocation in Distributed and Parallel Query Processing Environments—Peng Liu, 1989 IEEE.

The ins and outs of memory management. (Power Paradox 4.0) (Tutorial) Brian J. Smith, *Data Based Advisor*, v10, n12, p. 83(3) Dec. 1992.

*Primary Examiner*—Thomas G. Black
*Assistant Examiner*—Shahid Alam
*Attorney, Agent, or Firm*—Blakely, Sokoloff, Taylor & Zafman LLP

[57] ABSTRACT

A method and apparatus for implementing segmented arrays in a database system. According to one embodiment of the invention, rather than allocating a contiguous block of memory for each array, the memory for storing at least selected arrays is broken into smaller pieces of memory referred to herein as memory segments. When the memory for an array is broken into memory segments, the array is referred to herein as a "segmented array." Each memory segment associated with a segmented array is divided into one or more memory areas, each of which represent an element of that array. The memory segments associated with a segmented array need not be contiguous. According to another aspect of the invention, the number of segments allocated for a segmented array can be increased or decreased during execution. According to yet another aspect of the invention, only some of the memory segments required to store a segmented array are initially allocated. The remainder of the memory segments required to store the array are allocated on an as needed basis. According to another aspect of the invention, database systems may implement all or only some arrays as segmented arrays. In a database system that supports both segmented and contiguous arrays, whether the memory for a particular array is segmented or contiguous can depend on any number of factors.

17 Claims, 6 Drawing Sheets

Fig. 7

METHOD AND APPARATUS FOR IMPLEMENTING SEGMENTED ARRAYS IN A DATABASE

BACKGROUND OF THE INVENTION

1. Field of the Invention

The present invention relates to database management systems, and more specifically, to a method and apparatus for allocating memory for arrays.

2. Background Information

Many database systems take advantage of distributed processing by using a client/server architecture. In this architecture, the database is divided into two parts: a front end or a client portion, and a back end or a server portion. The client portion is the front end database application that interacts with the users through keyboards, displays, and pointing devices such as mice. The client portion concentrates on requesting, processing, and presenting data managed by the server portion. The server portion runs server software and handles the functions required for concurrent, shared data access. Of course, the client-server architecture can be distributed across a network. For example, each of the client applications may be executed at a different node of the network, while one or more other nodes on the network are used for storing the database and executing the server software to process database requests sent by users at the client nodes.

In typical database systems, client applications store, update and retrieve information by submitting commands to the server portion. To be correctly processed, the commands must comply with the database language that is supported by the server portion. One popular database language is known as Structured Query Language (SQL). To compile and execute SQL statements, the server portion includes an SQL engine. In response to receiving SQL statements originating from the client applications, the server portion compiles and executes the statements to perform the required operations on the information in the database.

In addition to the SQL language, it is advantageous to support the procedural functionality of a structured programming language. For purposes of illustration, this document describes the procedural language extension to SQL (PL/SQL) developed by Oracle Corporation. Of course, any procedural language extension may be used. A PL/SQL engine for compiling and executing routines (e.g., packages, procedures, functions, etc.) written in PL/SQL can be linked in either or both of the client and server sides. A PL/SQL routine may include PL/SQL statements or both PL/SQL and SQL statements. Having a PL/SQL engine on the server side allows clients to submit to the server portion individual PL/SQL statements, blocks of PL/SQL statements, and blocks of statements that include both PL/SQL and SQL statements. Having a PL/SQL engine on both the client and the server sides additionally allows clients to call PL/SQL routines stored on the server side.

Figure 1:
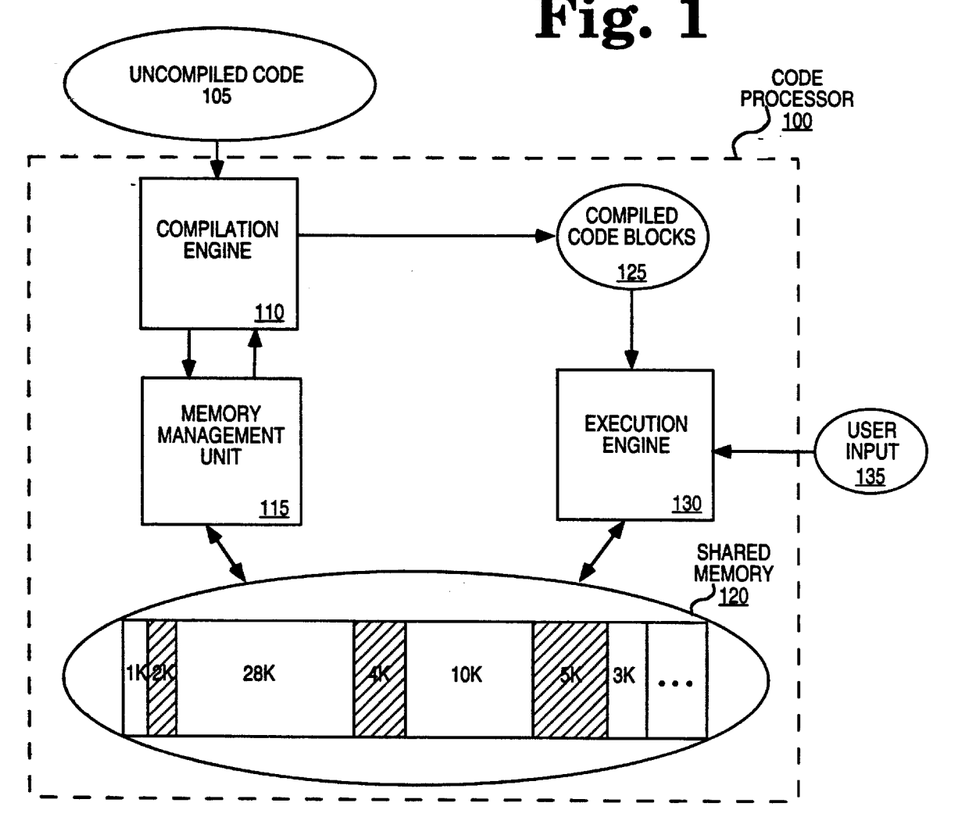
FIG. 1 is a block diagram illustrating the memory allocation technique used by a commercially available server portion of a database.

FIG. 1 is a block diagram illustrating the memory allocation technique used by a commercially available server portion of a database. FIG. 1 shows code processor 100 (e.g., PL/SQL and SQL engines) for compiling and executing uncompiled code 105 (e.g., individual PL/SQL statements, individual SQL statements, blocks of PL/SQL statements, PL/SQL routines, and blocks of statements that include both PL/SQL and SQL statements). In one implementation of the database, the code processor 100 includes separate PL/SQL and SQL engines that work together to execute PL/SQL and SQL statements. The separation of the PL/SQL and the SQL engines is not necessary to understanding the invention. Of course, alternative embodiments could use a single engine.

The code processor 100 includes a compilation engine 110 for compiling uncompiled code received by the code processor 100. As mentioned above, the compilation engine 110 may include separate PL/SQL and SQL compilation engines. During compilation, the compilation engine 110 calls the appropriate routines in a memory management unit 115 to allocate memory from a pool of memory 120 shared by the various clients connected to the server. In response to each request for memory from the shared memory 120, the memory management unit 115 allocates a contiguous memory block.

Over time, the allocation and deallocation of memory blocks results in fragmentation of the shared memory 120. As a result of fragmentation, it is difficult to find large contiguous memory blocks. As an example, the shared memory 120 is shown having 4 allocated memory blocks of 1K, 28K, 10K, and 3K and 4 unallocated memory blocks of 2K, 4K and 5K. Assuming the shared memory 120 included only the shown memory blocks, the allocation of another 6K contiguous memory block could not be provided without flushing/deallocating other memory blocks, even though 11K of the shared memory 120 is not being used. Furthermore, the right memory block(s) must be deallocated to acquire a 6K contiguous memory block (e.g., flushing the 1K memory block would not provide a 6K contiguous memory block).

While any number of techniques may be used by the memory management unit 115 to allocate memory, one technique uses what is referred to as a list of recreateable objects. According to this technique, each statement gets a separate recreateable object. Each recreateable object contains pointers to the various memory blocks allocated for that recreateable object's associated statement. Since the memory management unit 115 provides no mechanism for deallocating part of a recreateable object's associated memory, the memory management unit 115 must flush all of the memory associated with a recreateable object to free up memory.

In response to a request for memory, the memory management unit 115 determines if a contiguous memory block is available to satisfy the request. If a contiguous memory block is available, then that memory block is allocated and a pointer to that memory block is returned to the compilation engine 110. However, if a contiguous memory block is not available to satisfy the request, the memory management unit 115 must attempt to flush one or more recreateable objects. If no recreateable objects can be flushed, then the request for memory cannot be satisfied and a compilation error message is generated. However, if a recreateable object can be flushed, the memory management unit 115 flushes the memory associated with that recreateable object. Since the memory blocks pointed to by this recreateable object need not be contiguous, the flushing of these memory blocks may not free up a large enough piece of contiguous memory (e.g., if a 6K block of contiguous memory is required and the 1K block of contiguous memory was flushed). Therefore, after flushing one or more recreateable objects, the memory management unit 115 again determines if there is enough contiguous memory available to satisfy the request. If there is enough contiguous memory to satisfy the request, then the memory is allocated and a pointer to that memory is returned to the compilation engine 110. However, if there is not enough contiguous memory available to satisfy the request, then the process of attempting to flush one or more additional recreateable object is again performed in an attempt to free up more memory.

Since the availability of shared memory 120 affects server performance and limits the number of clients that can access the server, it is advantageous to efficiently utilize the shared memory 120. In an attempt to efficiently utilize the shared memory 120, the compilation engine 110 separately requests memory for each structure required by each statement being compiled and executed (as opposed to requesting one large memory block for each statement) in an attempt to reduce the size of the memory blocks that must be allocated and to allocate only the memory required for the compilation and execution of each statement. For example, if a statement requires three structures (e.g., three arrays), memory is separately allocated for each structure.

The compilation engine 110 generates compiled code blocks 125 which are executed by an execution engine 130. One compiled block of code can represent one or more statements. Each compiled code block contains the pointers to the contiguous memory blocks allocated during compilation and the logic to access those contiguous memory blocks for their intended purpose. In addition to accessing the compiled code blocks 125, the execution engine 130 also may receive user input 135. Again, systems that use separate PL/SQL and SQL engines, the execution engine 130 is implemented as separate PL/SQL and SQL execution engines.

The compilation and execution of certain statements submitted to the server portion require one or more arrays. An array is a data structure used for storing a collection of data of the same type (e.g., a collection of integer data). Each element in an array stores one piece of data. The elements of an array are ordered and are referenced using an index. For example, the first elements of an array may be array element 0, the second is array element 1, etc.

If an array is required for the compilation and/or execution of a statement, the compilation engine 110 requests one contiguous memory block for storing the entire array. When the memory for an array is allocated as one contiguous block, the array is referred to herein as a "contiguous array." The compilation engine 110 then inserts into the compiled code block for that statement the pointer to the contiguous memory block allocated for that array and the logic to access the data stored in the various elements of that array. The logic to access the data stored in the various elements of the an array may be provided using a number of techniques. For example, the source code could include macros, procedure calls, and/or function calls to access data in a particular element or in a particular set of elements in an array.

The location of the various elements of an array are determined using offsets into the contiguous memory block allocated for that array. Since the size of each array element is the same, the physical address of an array element may be calculated as follows:

pointer+(array_element_index*array_element_size)

Examples of arrays commonly required for the execution of PL/SQL and SQL statements include cursor arrays, bind arrays, and define list arrays. Cursor arrays are used for storing information about open cursors (for more information on cursors, see ORACLE 7 Server Administrators Guide, 1992, available from Oracle Corporation of Redwood City, Calif.). A different cursor array is created for each client session (for each connection of a client to a server). The number of elements in a cursor array identifies the maximum number of cursors that may be concurrently open during a client session. At the beginning of each client session, memory for the entire cursor array for that client session is allocated. Since each element of a cursor array requires a relatively large amount of memory (e.g., 22 bytes), cursor arrays often require the allocation of large amounts of contiguous memory from the shared memory 120. In addition, the number of concurrently open cursors does not always reach the maximum number allowed during a client session. If the maximum number of concurrently open cursors is not reached during a client session, the unused elements of the cursor array are wasted memory space.

Bind arrays are used for storing information describing any user data (referred to herein as "bind variables") required for the execution of a statement. For example, elements of a bind array are used for storing data describing the attributes of the predicate in a SELECT statement (for more information on SELECT statements, see ORACLE 7 Server SOL Language Reference Manual, 1992, available from Oracle Corporation of Redwood City, Calif.). The attributes of a bind variable stored in an element of a bind array include the bind variable's data type, length, etc. Since each element of a bind array requires a relatively large amount of memory (e.g., 68 bytes) and since there may be over a thousand bind variables per bind array, bind arrays often require the allocation of large amounts of memory from the shared memory 120.

Define list arrays are used for storing information describing any data to be returned to the user after execution of a statement. For example, elements of a define list array are used for storing data describing the attributes of the record type or list of simple variables in the INTO clause of a SELECT statement. Since each element of a define list array requires a relatively large amount of memory and there may be over a thousand pieces of data returned to the user, define list arrays also often require the allocation of large amounts of memory from the shared memory 120. In addition to often requiring large amounts of memory, the size of a define list can increase or decrease. As a result, the execution engine 130 increases the size of define list arrays as required. The execution engine 130 increases the size of a define list array by allocating a new contiguous memory block for that define list array, copying the contents from the old contiguous memory block into the new contiguous memory block, and deallocating the old contiguous memory block. This process is slow and degrades performance of the database.

As previously stated, the memory for an array is allocated as a single contiguous block of memory. As a result, arrays that require large amounts of memory require the allocation of large contiguous memory blocks. Due to fragmentation of the shared memory 120, the allocation of large contiguous memory blocks requires flushing large amounts of data and/or limiting the number of clients accessing the server. The flushing of large amounts of data often results in inefficient use of the server due to thrashing of the shared memory 120 (the constant loading and flushing of the same data). In addition, since only large contiguous memory blocks are required, small pieces of memory between allocated contiguous memory blocks cannot be used. The inability to utilize memory between allocated contiguous memory block results in inefficient utilization of the shared memory 120.

SUMMARY

A method and apparatus for implementing segmented arrays in a database system is described. According to one embodiment of the invention, rather than allocating a contiguous block of memory for each array, the memory for storing at least selected arrays is broken into smaller pieces of memory referred to herein as memory segments. When the memory for an array is broken into memory segments, the array is referred to herein as a "segmented array." Each memory segment associated with a segmented array is divided into one or more memory areas, each of which represent an element of that array. The memory segments associated with a segmented array need not be contiguous.

According to another aspect of the invention, the number of segments allocated for a segmented array can be increased or decreased during execution. According to yet another aspect of the invention, only some of the memory segments required to store a segmented array are initially allocated. The remainder of the memory segments required to store the array are allocated on an as needed basis.

According to another aspect of the invention, database systems may implement all or only some arrays as segmented arrays. In a database system that supports both segmented and contiguous arrays, whether the memory for a particular array is segmented or contiguous can depend on any number of factors.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for implementing segmented arrays in a database is described. In the following description, numerous specific details are set forth to provide a thorough understanding of the invention. However, it is understood that the invention may be practiced without these specific details. In other instances, well-known circuits, structures and techniques have not been shown in detail in order not to obscure the invention. Since in one embodiment the PL/SQL and SQL compilers are written in the C programming language, the example code described herein is in the C programming language. However, it is understood that alternative embodiments could be implemented using any number of programming languages.

HARDWARE OVERVIEW

Figure 2:
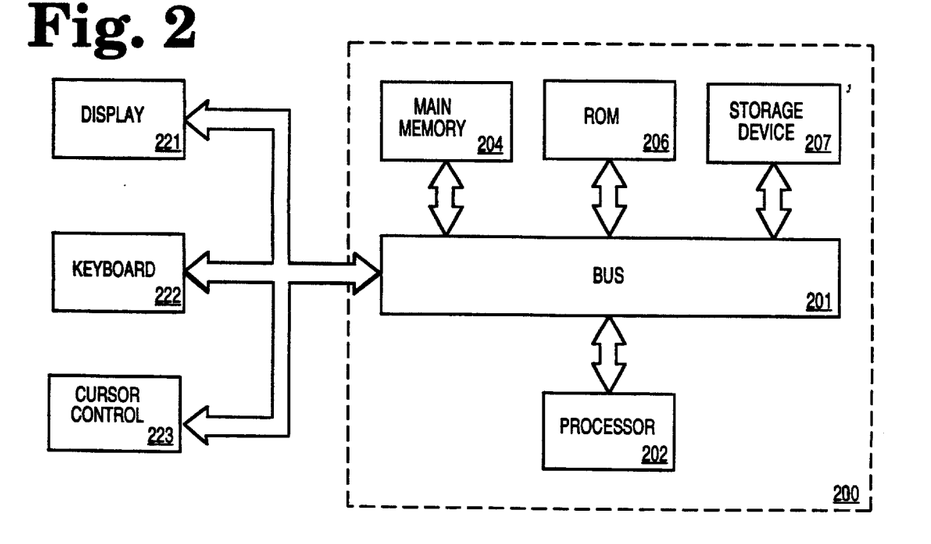
FIG. 2 is a block diagram illustrating an exemplary computer system 200 upon which the invention can be implemented.

FIG. 2 is a block diagram illustrating an exemplary computer system 200 upon which the invention can be implemented. The computer system 200 comprises a bus or other communication means 201 for communicating information, and a processing means 202 coupled with the bus 201 for processing information. The computer system 200 further comprises a random access memory (RAM) or other dynamic storage device 204 (referred to as main memory), coupled to the bus 201 for storing information and instructions to be executed by the processor 202. A main memory 204 also may be used for storing temporary variables or other intermediate information during execution of instructions by the processor 202. The computer system 200 also comprises a read only memory (ROM) and/or other static storage device 206 coupled to the bus 201 for storing static information and instructions for the processor 202. A data storage device 207, such as a magnetic disk or optical disk and its corresponding disk drive, may also coupled to the bus 201 for storing information and instructions.

The computer system 200 can also be coupled via the bus 201 to a display device 221, such as a cathode ray tube (CRT), for displaying information to a computer user. An alphanumeric input device 222, including alphanumeric and other keys, is typically coupled to the bus 201 for communicating information and command selections to the processor 202. Another type of user input device is cursor control 223, such as a mouse, a trackball, or cursor direction keys for communicating direction information and command selections to the processor 202 and for controlling cursor movement on the display 221. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack the keyboard 222, wherein all interface is provided via the stylus as a writing instrument (like a pen) and the written text is interpreted using optical character recognition (OCR) techniques.

In one embodiment, the invention is related to the use of the computer system 200 to implement a database supporting segmented arrays. In this embodiment, segmented arrays are generated and manipulated by the computer system 200 in response to the processor 202 executing sequences of instructions contained in the memory 204 as described later herein. In alternative embodiments, hard-wired circuitry may be used in place of or in combination with software instructions to implement the invention. Thus, the invention is not limited to any specific combination of circuitry and software. Furthermore, while the invention is being described with reference to a computer system having one computer with one processor, the invention may be implemented on a computer system that includes a network of computers each having one or more processors.

SEGMENTED ARRAY OVERVIEW

According to one embodiment of the invention, rather than allocating a contiguous block of memory for each array, the memory for storing selected arrays is broken into smaller pieces of memory referred to herein as memory segments. When the memory for an array is broken into memory segments, the array is referred to herein as a "segmented array." Each memory segment associated with a segmented array is divided into one or more memory areas, each of which represent an element of that array. The memory segments associated with a segmented array need not be contiguous. In one embodiment, a segment header memory area is created for each array to store data identifying the memory segments and/or the memory areas inside the memory segments associated with that array.

Whether the memory for a particular array is segmented or contiguous can depend on any number of factors. Examples of the factors that can be used individually or in combination to determine how the memory for an array is to be allocated include: 1) the size of the elements in the array; 2) the number of elements in the array; and 3) the type of data to be stored in the array.

Since the memory required for a segmented array is allocated in several smaller pieces, a large contiguous memory block is not required for that array. By avoiding need to allocate large contiguous memory blocks for segmented arrays, the effects of fragmentation are reduced and efficiency of shared memory usage is improved. Improving the efficiency of shared memory usage allows the number of clients applications accessing the server to be increased and/or improves the performance of the server. According to another aspect of the invention, one embodiment of the invention also allows the number of memory segments allocated for a segmented array to be increased and decreased.

One embodiment of the invention supports both segmented and contiguous arrays because it is not always efficient to implement all arrays as segmented arrays. For example, if the total memory required for the elements of an array is small, more memory is required to implement that array as a segmented array as opposed to a "contiguous array" (an array for which the memory is allocated as a contiguous block). In addition, more time and processing power is required to access the elements of a segmented array than a contiguous array. While an embodiment which supports both segmented and contiguous arrays is described below, it is understood that alternative embodiments may support only segmented arrays.

Figure 3A:
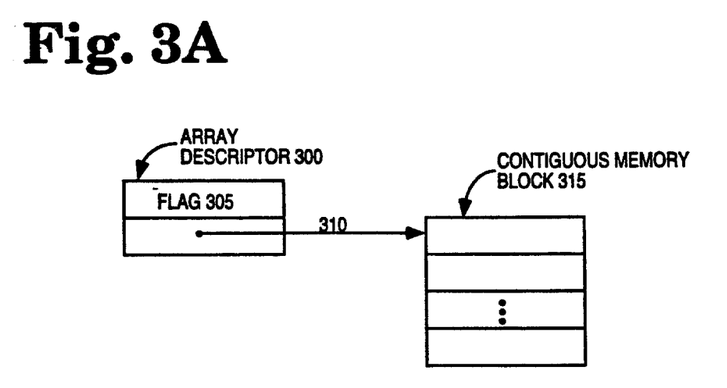
FIG. 3A is a block diagram illustrating the memory allocated for a contiguous array according to one embodiment of the invention.
Figure 3B:
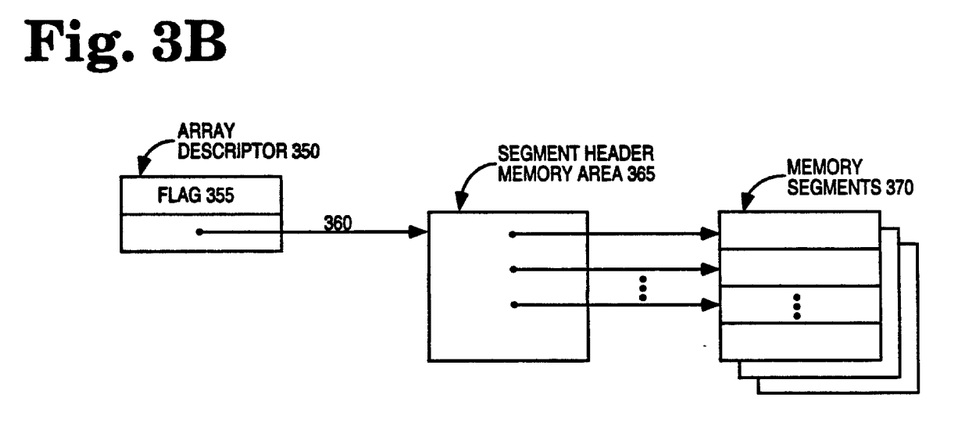
FIG. 3B is a block diagram illustrating the memory allocated for a segmented array according to one embodiment of the invention.

FIGS. 3A and 3B are block diagrams respectively illustrating the memory allocated for contiguous arrays and segmented arrays according to one embodiment of the invention. When using the format shown in FIGS. 3A and 3B, an array descriptor containing a pointer and a flag (the term flag is used herein to refer to one or more bits) is created for each array. Of course, additional information not necessary to understanding the invention may also be stored as part of the array descriptor. If an array is a contiguous array, the pointer in the array's array descriptor identifies the contiguous block of memory allocated for that array. For example, FIG. 3A shows an array descriptor 300 containing both a flag 305 indicating the array is a contiguous array and a pointer 310 identifying a contiguous block of memory 315. In contrast, if an array is a segmented array, the pointer in the array's array descriptor identifies the segment header memory area for the segmented array. For example, FIG. 3B shows an array descriptor 350 containing both a flag 355 indicating the array is a segmented array and a pointer 360 identifying a segment header memory area 365. The segment header memory area 365 stores data identifying the memory segments 370 allocated for the array.

Of course, alternative embodiments could indicate whether an array is segmented or contiguous using any number of techniques. For example, an embodiment may support a first array descriptor type for implementing segmented arrays and a second array descriptor type for implementing contiguous arrays. Since the first and second array descriptor types each support only one array type, the first and second array descriptor types need not include a flag for indicating whether the array is segmented or contiguous. Whether the first or second array descriptor type is used could depend on any number of factors. Other embodiments may additionally support a third array descriptor type similar to that shown in FIGS. 3A and 3B that can be used for implementing either segmented or contiguous arrays. Still other embodiments may support the third array descriptor type and either the first or second array descriptor types.

INCORPORATION OF SEGMENTED ARRAYS INTO A DATABASE MANAGEMENT SYSTEM

Figure 4:
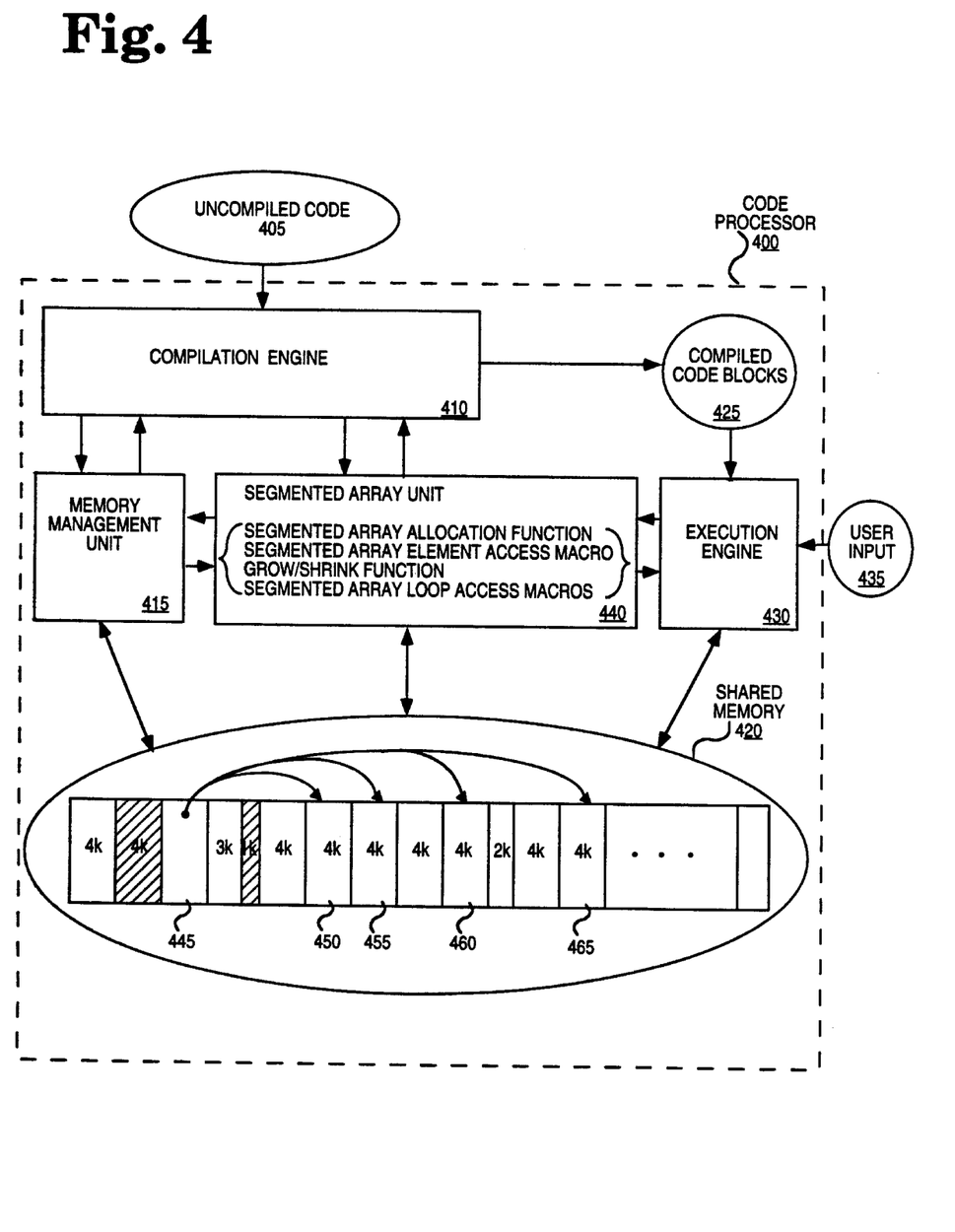
FIG. 4 is a block diagram illustrating the incorporation of segmented arrays into a database management system according to one embodiment of the invention.

FIG. 4 is a block diagram illustrating the incorporation of segmented arrays into a database management system according to one embodiment of the invention. Similar to FIG. 1, FIG. 4 shows a code processor 400 for processing uncompiled code 405 (e.g., individual PL/SQL statements, individual SQL statements, blocks of PL/SQL statements, blocks of PL/SQL and SQL statements, and PL/SQL routines). Like the code processor 100 from FIG. 1, the code processor 400 includes a compilation engine 410, a memory management unit 415, and an execution engine 430 for respectively compiling the uncompiled code 405 into complied code blocks 425, allocating memory from a shared memory 420, and executing the compiled code blocks 425. Similar to FIG. 1, the allocation of memory for a contiguous arrays is performed by the compilation engine 410 submitting a request to the memory management unit 415 for a contiguous block of memory.

Unlike FIG. 1, FIG. 4 includes a segmented array unit 440. The segmented array unit 440 represents the routines and/or macros required to allocate and deallocate memory for segmented arrays, as well as to access data stored in the elements of segmented arrays. The compilation engine 410 satisfies memory requests for segmented arrays by calling a segmented array allocation function in the segmented array unit 440, as opposed to the memory allocation routine in the memory management unit 415. In addition, the compilation engine 410 accesses macros in the segmented array unit 440 for the necessary code to access the data stored in the elements of segmented arrays. Furthermore, the execution engine 430 calls a grow/shrink function in the segmented array unit 440 to allocate or deallocate memory segments for segmented arrays as required.

Memory Allocation for Arrays

Figure 5:
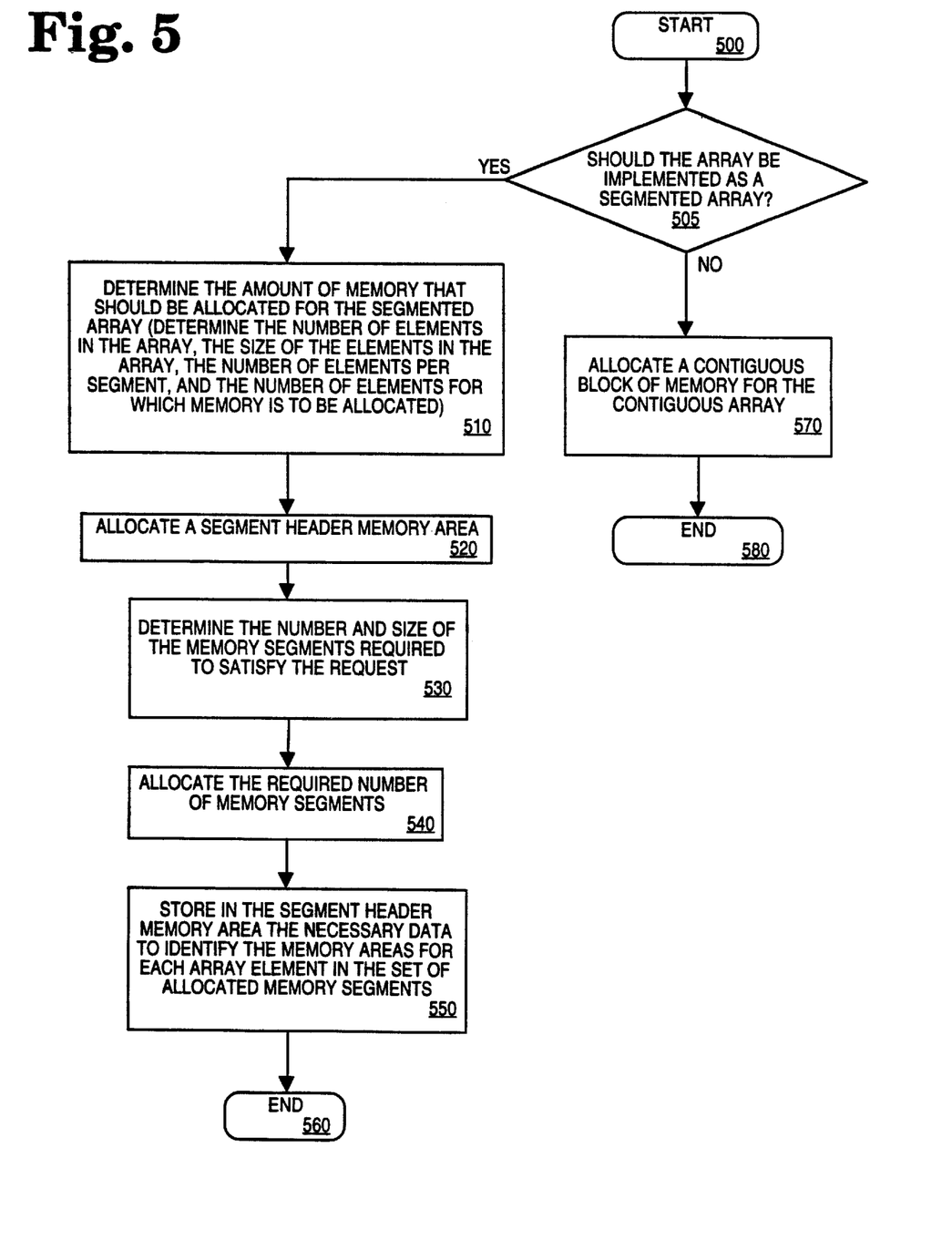
FIG. 5 is a flow diagram illustrating the steps performed to allocate memory for arrays according to one embodiment of the invention.

FIG. 5 is a flow diagram illustrating the steps performed to allocate memory for arrays according to one embodiment of the invention. The flow diagram starts at step 500, from which control passes to step 505.

As shown in step 505, it is determined if the array will be implemented as a segmented array. If the array will be implemented as a segmented array, control passes to step 510. Otherwise, control passes to step 570. Regardless of whether the array will be implemented as a contiguous array or a segmented array, in one embodiment of the invention the compilation engine 410 creates an array descriptor and alters the flag in that array descriptor to appropriately indicate whether the array is being implemented as a contiguous array or a segmented array.

The manner in which step 505 is performed depends upon the factors used in determining whether a particular array should be implemented as a segmented array or a contiguous array. For example, in an embodiment in which the amount of memory required to store an array is used to determine whether the array should be segmented, the compilation engine 410 would cause the array to be implemented as a segmented array if the array will require over a certain threshold amount of memory. To determine if the array requires over the threshold amount of memory, the compilation engine 410: 1) determines the number of elements in the array (num_of_elements); 2) determines the size of the elements in the array (element_size); 3) multiplies num_of_elements by element-size; and 4) compares the result of the multiplication to the threshold amount of memory.

Of course embodiments of the invention can be implemented to use different factors in determining whether to implement an array as a segmented or contiguous array. In addition, embodiments of the invention can be implemented to consider both the type of data to be stored in the array and the amount of memory the array will require when determining whether to implement an array as a contiguous or segmented array. Furthermore, embodiments of the invention may use different threshold amounts of memory for arrays used to store different types of data.

In one embodiment, the threshold amount of memory over which an array is implemented as a segmented array is 4K and the maximum size of the memory segments allocated for a segmented array is 4K. By limiting the size of memory allocations for contiguous arrays and the size of the memory segments for segmented arrays to 4K, the problems associated with requiring large contiguous memory blocks for arrays is avoided. In addition, by allocating memory segments of roughly the same small size, the deallocation of one memory segment will often be sufficient to satisfy the memory requirements of another contiguous array or memory segment. Since the deallocation of one memory segment will often be sufficient to satisfy the memory requirements of another memory segment, the number of memory segments that must be flushed to satisfy a memory request is reduced and server efficiency is increased. Furthermore, since all pieces of memory allocated for arrays are of the same small size, memory utilization is increased because the size of unusable memory pieces between allocated pieces of memory is decreased. Of course, alternative embodiments could use a different maximum size for contiguous arrays and/or a different maximum size for memory segments.

While one embodiment is described in which step 505 is performed during the creation of each array, alternative embodiments may avoid performing step 505 for certain arrays. For example, an alternative embodiment may support different classes of arrays: 1) arrays that are always implemented as segmented arrays (e.g., bind arrays); 2) arrays for that are always implemented as contiguous arrays; and/or 3) arrays that are selectively implemented on an array by array basis as either segmented or contiguous arrays based on certain factors (e.g., memory requirements). While step 505 is performed for the creation of an array belonging to the third class of arrays, in one embodiment of the invention step 505 is not performed for the creation of an array belonging to either the first or second class of arrays. For example, control passes directly from step 500 to step 510 for the creation of an array belonging to the first class of arrays.

In step 510, the amount of memory that should be allocated for the segmented array is determined. In one embodiment, the compilation engine 410 determines the amount of memory required for a segmented array by determining the number of elements in the array (num_of_elements), the size of the elements in the array (element size), and the number of array elements per memory segment (elements_per_seg). In one embodiment, the compilation engine 410 can also specify that not all of the memory required to store all of the array elements should be allocated at this time. While there are any number of techniques for indicating that not all of the memory for an array is to be currently allocated, one embodiment calculates the number of array elements for which memory is to be allocated (num_to_alloc). If the value for num_to_alloc is less than the value of num_of_elements, memory will not be allocated for all of the array elements. After determining the amount of memory that should be allocated, the compilation engine 410 calls the segmented allocation routine in the segmented array unit 440 with the memory request. From step 510, control passes to step 520.

As shown in step 520, a segment header memory area is allocated and control passes to step 530. In the described embodiment, execution of the segmented array allocation function causes the processor to execute the memory allocation routine in the memory management unit 415 to allocate the segment header memory area. Execution of the memory allocation routine causes a pointer to the segment header memory area to be returned to the segmented array allocation function.

In step 530, the number and size of the memory segments required to satisfy the memory request is determined and control passes to step 540. In the described embodiment, step 530 is performed in response to executing the segmented array memory allocation function. The size of the memory segments is determined by multiplying the number of array elements per memory segment (elements_per_seg) by the size of the array elements (element_size). The number of memory segments required is determined by dividing the number of array elements for which memory is to be allocated (num_to_alloc) by number of array elements per memory segment (elements_per_seg).

After determining the number and size of the memory segments required to satisfy the memory request, the required memory segments are allocated (step 540). In the described embodiment, execution of the segmented array allocation function causes the memory allocation routine in the memory management unit 415 to be repetitively executed to allocate the required number of memory segments. Each time the memory allocation routine is executed, a pointer to the allocated memory segment is returned to the segmented array allocation function. From step 540, control passes to step 550.

At step 550, data is stored in the segment header memory area for identifying the memory areas inside the memory segments for each element of the array. In the described embodiment, step 550 is also performed in response to executing the segmented array allocation function. The data stored in the segment header memory area can take any number of forms. For example, the data stored in the segment header memory area could comprise a pointer to each memory segment, an order in which the memory segments are to be processed, the size of each array element, and the number of elements per memory segment. With reference to FIG. 4, a segment header memory area 445 is shown storing pointers to memory segments 450, 455, 460, and 465 to allocate 16K for an array. As another example, the data stored in the segment header memory area could comprise a pointer to each array element memory area in the memory segments. In this embodiment, the pointers are stored in the order of the elements in the array (the pointer to the first array element is first, the pointer to the second array element is second, etc.). Thus, the invention is not limited to the technique used to locate the various memory areas in the memory segments for the elements in the array.

In addition to identifying the memory areas inside the memory segments for each element of an array, one embodiment of the segmented array allocation routine also causes the values of num_of_elements, element_size, elements_per_seg, and num_to_alloc to be stored in the segment header memory area. In the described embodiment, the segment header memory area is allocated separately from the memory segments for the array elements. However, alternative embodiments could be implemented to include the segment header memory area in one of the memory segments for the array elements.

From step 550, control passes to step 560 where the flow diagram ends. In the described embodiment, the segmented array allocation routine returns to the compilation engine 410 a pointer (seg) to the segment header memory area (step 570). The compilation engine 410 stores this pointer in the array descriptor to provide access to the segmented array.

At step 570, a contiguous block of memory is allocated for the contiguous array and control passes to step 580 where the flow diagram ends. In one embodiment, the compilation engine 410 determines the amount of memory required by the array and causes the processor to execute the memory allocation routine in the memory management unit 415 to allocate the required memory. Execution of the memory allocation routine causes a pointer to the allocated contiguous block of memory to be returned to the compilation engine 410. The compilation engine 410 stores the returned pointer in the array descriptor.

Accessing An Element in an Array

In those portions of the compiled code blocks 425 where an element of array must be accessed, the compilation engine 410 stores the necessary logic for the execution engine 430 to locate the memory area allocated for that array element. The appropriate logic for locating the memory area allocated for an array element depends on whether the array is implemented as a segmented array or a contiguous array. The compilation engine 410 determines the manner in which the array was implemented by inspecting the flag in the array descriptor created for that array. In one embodiment, the compilation engine 410 includes a precompiler for preparing the source code (305) for compilation. In an embodiment including such a precompiler, the logic for locating the memory area allocated for an array element in a segmented array is incorporated by the precompiler of the compilation engine 410 as part of the source code to be compiled using a segmented array element access macro that is part of the segmented array unit 440. The compilation engine 410 uses the segmented array element access macro to provide access to an array element, as opposed to calling a routine, because calling a routine requires additional overhead. However, alternative embodiments could be implemented to call a routine to provide access to array elements.

Figure 6:
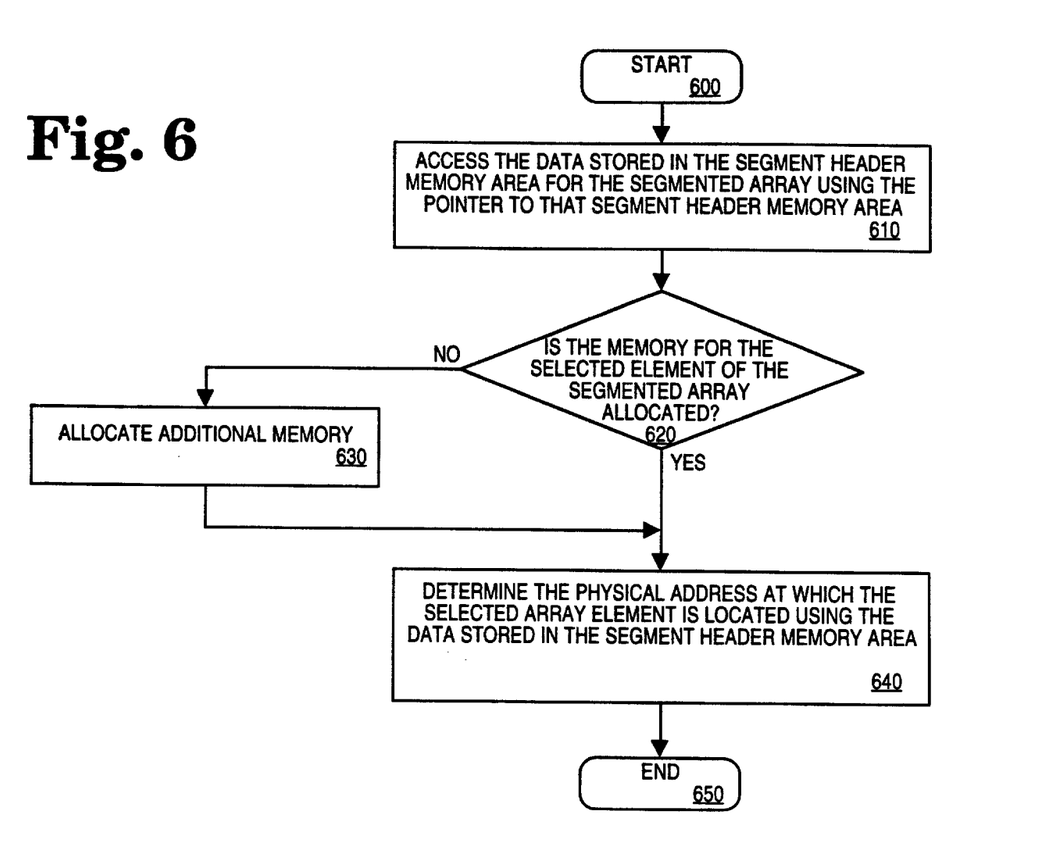
FIG. 6 is a flow diagram illustrating the steps performed to access an array element in a segmented array according to one embodiment of the invention.

FIG. 6 is a flow diagram illustrating the steps performed to access an array element in a segmented array according to one embodiment of the invention. The flow diagram starts at step 600, from which control passes to step 610.

In step 610, the data stored in the segment header memory area for the segmented array is accessed and control passes to step 620. The segment header memory area is located using the pointer in the array descriptor for the array.

In step 620, it is determined if the memory has been allocated for the array element to be accessed. If the memory for the selected array element has not been allocated, flow passes to step 630. Otherwise, flow passes to step 640. The memory for the selected element may not be allocated if it was determined in step 510 not to allocate all the memory required for the array. Whether the memory for the selected element has been allocated is determined using the data stored in the segment header.

As shown in step 630, additional memory is allocated and control passes to step 640. In one embodiment, the grow/shrink function is called to allocate memory for the selected array element and control passes to step 640. The operation of the grow/shrink function will be described later herein.

At step 640, the physical address at which the selected array element is located is determined using the data stored in the segment header. The determination of this physical address depends on the convention used for storing the data in the segment header memory area. For example, if the data stored in the segment header memory area is a set of pointers identifying each of the memory areas in the memory segments, this determination is made by simply identifying which of these pointers is associated with the selected element. Thus, if this set of pointers is stored sequentially in the segment header memory area beginning at a starting address, the offset from that starting address of the pointer associated with the selected array element can be calculated based upon the size of the pointers and the number of the location in the array for the selected array element. From step 640, control passes to step 650.

At step 650, the flow diagram ends. Since a pointer to the memory area storing the selected array element has been generated, the execution engine 430 can read or write to that memory area.

In one embodiment, the segmented array element access macro takes the following format:

```
#define KSMSEGIF (seg, index, element_size, elements_per_seg)
    ((index > seg->num_of_elements) ? (dvoid *) 0:
    (index > seg->num_to_alloc) ? ksmsgam(seg, index) : (dvoid *)
    ((ub1 *) seg->entp[index/elements_per_seg] + (index %
        elements_per_seg) * element_size);
```

In the above define statement, seg is a pointer to the segment header, index is a number identifying the location in the array of the selected array element, element_size identifies the size of each element in the array, and elements_per_seg identifies the number of elements in each memory segment. The macro operates as follows:
  if the index is greater than the number of elements that can be in the array (index>seg->num_of_elements), then return 0
  else if the index is greater than the number of currently allocated elements (index>seg->num_to_alloc), then allocate the required number of additional memory segments and return the address for the selected array element;
  else determine which memory segment contains the element identified by the index (index/elements_per_ seg), determine the base pointer to that memory segment (seg->entp[index/elements_per_seg]), determine the address for the selected element by adding the appropriate offset [(index %elements_per_seg)*element_size] to the base pointer for that memory segment, and return the address for the selected array element.

Growing and Shrinking the Memory Allocation for Segmented Arrays

In response to a request to increase or decrease the amount of memory allocated to a segmented array, execution of the grow/shrink function causes the processor to allocate or deallocate memory segments and update the data stored in the segment header memory area. As previously described with reference to step 630 from FIG. 6, the grow/shrink function may be called when access to an element of an array is attempted for which memory has not been allocated. In addition, the grow/shrink function may be called as required by the execution engine 430 in response to executing compiled code blocks 425.

Figure 7:
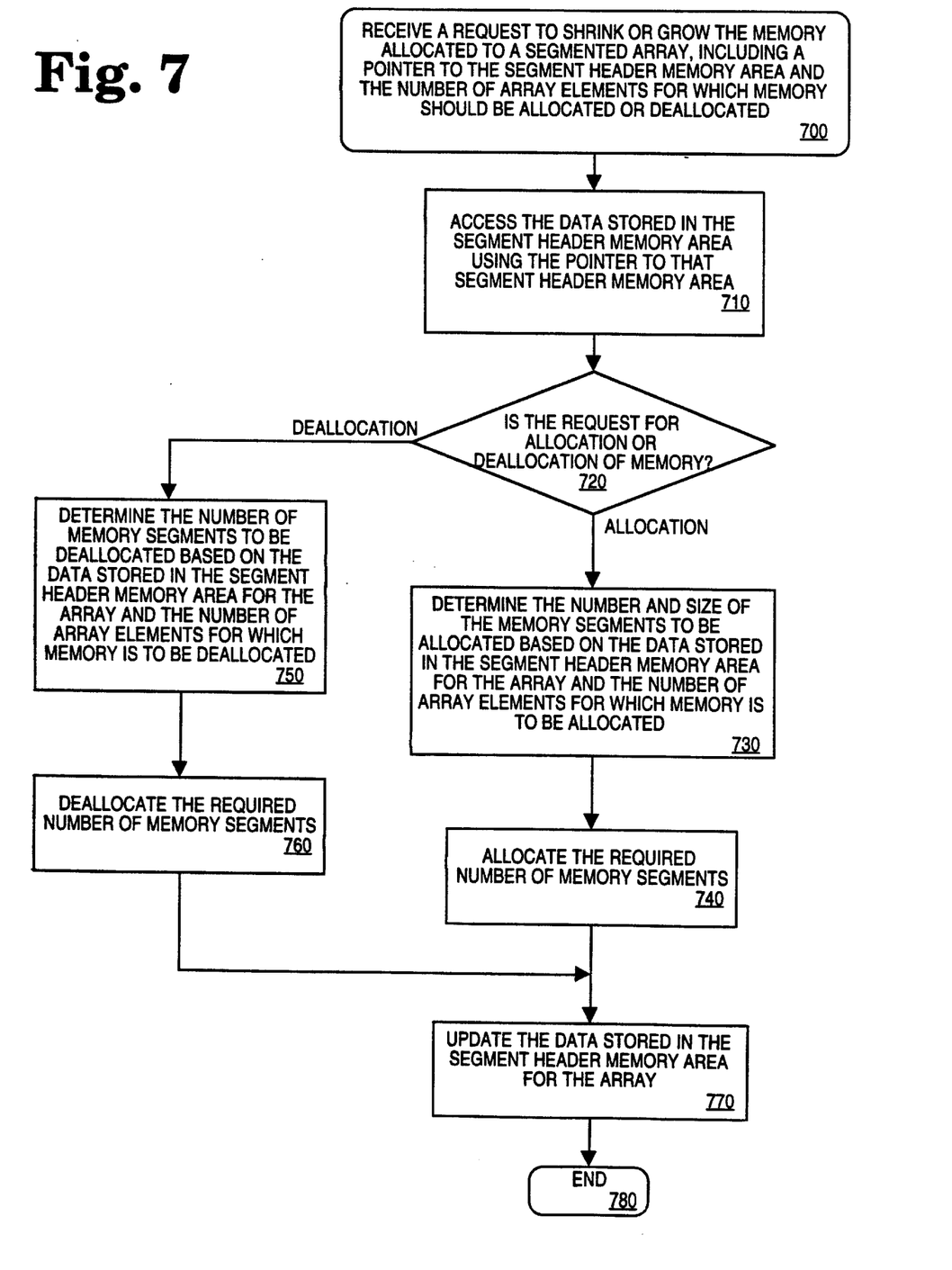
FIG. 7 is a flow diagram illustrating the steps performed to grow or shrink the memory allocated to a segmented array according to one embodiment of the invention.

FIG. 7 is a flow diagram illustrating the steps performed to grow or shrink the memory allocated to a segmented array according to one embodiment of the invention. The flow diagram starts at step 700, from which flow passes to step 710. In one embodiment, the grow/shrink function receives as arguments a pointer to the segment header memory area for the array (seg) and the number of array elements for which memory should be allocated or deallocated (num_to_grow_or_shrink).

As shown in step 710, the data stored in the segment header memory area for the array is accessed using the pointer to that segment header memory area. From step 710, flow passes to step 720.

As shown in step 720, it is determined if the request is for the allocation or deallocation of memory. In one embodiment, the value of num_to_grow_or_shrink is positive for memory allocations and negative for memory deallocations. If the request is for the allocation of memory, flow passes to step 730. Otherwise, flow passes to step 750.

As shown in step 730, the number and size of the memory segments to be allocated is determined based on the data stored in the segment header memory area and the value of num_to_grow_or_shrink. In one embodiment, the size of the memory segments is determined by multiplying the number of array elements per segment (elements_per_seg) by the size of the array elements (element_size), while the number of memory segments to be allocated is determined by dividing the number of array elements for which memory is to be allocated (num_to_grow_or_shrink) by the number of array elements per memory segment (elements_per_seg). From step 730, flow passes to step 740.

At step 740, the required memory segments are allocated. In the described embodiment, the memory allocation routine in the memory management unit is called the required number of times to allocate the required number of memory segments. From step 740, flow passes to step 770. In one embodiment, the additional memory segments that are allocated are not initialized (e.g., zeroed out) before returning from the grow/shrink function and it is the responsibility of other routines to initialize those memory segments. In an alternative embodiment, the additional memory segments are initialized before returning from the grow/shrink function.

At step 750, the number of memory segments to be deallocated is determined based on the data stored in the segment header memory area for the array and the value of num_to_grow_or_shrink. The number of memory segments to be deallocated is determined by dividing the number of array elements for which memory is to be deallocated (num_to_grow_or_shrink) by the number of array elements per memory segment (elements_per_seg). From step 750, flow passes to step 760.

As shown in step 760, the determined number of memory segments are deallocated. In one embodiment, a memory deallocation routine in the memory management unit is called the required number of times to deallocate the required number of memory segments. From step 760, flow passes to step 770.

As shown in step 770, the data stored in the segment header memory area for the array is updated and control passes to step 780 where the flow diagram ends.

Accessing Array Elements in Arrays Using A Loop

A number of applications require a set of array elements be accessed in order. According to one embodiment of the invention, the compilation engine 410 generates compiled code to loop through the elements of an array using a counter to keep track of the index number of the array element currently being processed. If the array is a contiguous array, a loop is provided that includes the logic to sequentially access the elements in the contiguous memory block for the array. In contrast, if the array is a segmented array, the logic of the segmented array element access macro described above would be inserted within the context of the loop to access each array element.

In another embodiment, a set of macros (referred to herein as the segmented array loop access macros) are additionally provided for accessing in sequential order more than one array element in a segmented array in a more efficient manner than the segmented array access macro with the context of a loop. The segmented array loop access macros provide a more efficient solution because the base address of each memory segment only needs to be determined once. Of course, routines could have been used instead of macros, but macros provide improved performance.

The segmented array loop access macros operate by first determining the base address of the first memory segment allocated for the array. Once the base address for the first memory segment has been determined, the address of each array element in that memory segment is successively determined by adding an offset to the address of the previous array element. Once all of the array elements in a memory segment have been accessed, the base address of the next memory segment is determined and the process of determining the addresses of the array elements in that memory segment is repeated. When the last element in the array is detected, the loop terminates.

The segmented array loop access macros are referred to herein as KSMSGINI and KSMSGNXT. The KSMSGINI macro is used for initializing the state of the scan, while the KSMSGNXT macro returns the next element in the scan. In one embodiment, the definition of the KSMSGINI macro is as follows:

```
#define KSMSGINI (seg, state)
{
    state.item = -1;
    state.sitem = seg->sgitems;
    state.pitem = (dvoid *) 0;
}
``` where the seg argument is a pointer to the segment header memory area for the array, and the state argument is a pointer to a memory area storing state information needed to keep track of how to access the next array element. This state information includes the total number of array elements already accessed (state.item), the number of array elements accessed in the current memory segment (state.sitem), and a pointer to the current array element's address (state.pitem).

The KSMSGNXT macro returns the next element in the segmented array to the calling application. Like the KSMSGINI macro, the KSMSGNXT macro takes seg and state as arguments and returns a pointer to the address of the next array element if all of the array elements have not been processed. When the last array element has been processed, the KSMSGNXT macro returns null. In one embodiment, the definition of the KSMSGNXT macro is as follows:

```
#define KSMSGNXT (seg, state)
        ((++state->element > seg->num_to_alloc) ?
                (dvoid *) 0 :
        (++state->selement > seg->sgitems) ?
                ksmsgns (seg, state) : ++state->pitem)
```

The operation of the KSMSGNXT macro is as follows:
 if the number of the next array element is greater than the total number of elements in the array (++state->element>seg->num_to_alloc), then return a NULL pointer;
 else if the number of the next element to be accessed in the current memory segment is greater than the number of elements in the current memory segment (++state->selement>seg->sgitems), then call the routine ksmsgns to move to the next memory segment, increment the total number of elements accessed counter, set the total number of elements accessed in the current memory segment counter to zero, and set the current element pointer to the first element in the new memory segment;
 else increment the total number of elements accessed counter, increment the total number of elements accessed in the current memory segment counter, and set the current element pointer to point to the next element in the current memory segment.

EXAMPLE USES FOR SEGMENTED ARRAYS

As previously described, cursor arrays, bind arrays, and define list arrays often require large amounts of memory. By implementing each of these array types using segmented arrays, the problems associated with allocating large contiguous memory blocks for these arrays is avoided and server efficiency is improved.

Since the number of concurrently open cursors during a client session does not always reach the maximum number allowed by a cursor array, the unused elements of the cursor array for that client session are wasted memory space. In order to further improve usage of the shared memory, one embodiment of the invention does not initially allocate the memory for all of the elements of cursor arrays. In this embodiment, memory is allocated for only a subset of the elements of a cursor array for a particular client session when that client session is begun. If it is later determined that additional cursors need to be opened, more memory is allocated for additional elements of the cursor array as needed. While in one embodiment memory is allocated individually for each additional cursor required, an alternative embodiment allocates memory for a fixed number of cursors each time a shortage of cursors is encountered. By allocating memory for cursors on an as-needed basis, the database can provide a high open-cursor count for all clients without allocating memory for cursors that are not being used.

As previously described, the size of a define list may increase or decrease. Since the size of a define list can change, one embodiment of the invention is implemented to use the grow/shrink function to allocate and deallocate memory for define list arrays as required. By allocating and deallocating memory in this manner, this embodiment avoids the performance-expensive steps required by the prior art to increase the size of a define list array. In addition, this embodiment provides more efficient use of the shared memory by deallocating unused memory when the size of a define list is decreased.

ALTERNATIVE EMBODIMENTS

While one embodiment is described in which all arrays are segmented, alternative embodiments may be implemented to segment only certain types of arrays, only arrays used for a certain purposes, etc. For example, alternative embodiments may be implemented in which any combination of cursor arrays, bind arrays, define list array, and/or other arrays are segmented, but not all arrays are segmented.

In addition, while one embodiment has been described in which the processing to create and manipulate segmented arrays was distributed between the compilation engine, the macros/routines of the segmented array unit and the execution engine in a particular manner, alternative embodiments could distribute this processing any number of ways. For example, rather than having the compilation engine determine the number of elements per segment, an embodiment could be implemented in which the number of elements per segment is determined in response to executing the segmented array allocation function. Thus, the invention is not limited by the manner in which the processing to create and manipulate segmented arrays is implemented.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A method for allocating memory in a database system, said method comprising the computer-implemented steps of:
   detecting that an array for storing information related to said database system is required, wherein said array includes a plurality of elements;
   determining that a first amount of memory is required to store said array;
   determining that a set of one or more memory segments is to be allocated for said array, wherein each memory segment in said set of one or more memory segments is smaller than said first amount of memory;
   allocating said set of one or more memory segments, wherein said set of one or more memory segments need not be contiguous, wherein each of said set of one or more memory segments includes a set of one or more memory areas, and wherein each memory area in each of said sets of one or more memory areas is for storing data associated with a different element of said array; and
   storing in a segment header memory area data for identifying said set of one or more memory segments.

2. The method of claim 1, wherein the sum of memory allocated for said set of one or more memory segments is equal to or greater than said first amount of memory.

3. The method of claim 1, further comprising the steps of:
accessing a first element of said array by performing the steps of:
reading the data in said segment header memory area;
determining that a first memory area in one of said set of one or more memory segments is associated with said first element of said array; and
accessing said first element by reading or writing data to said first memory area.

4. The method of claim 3, wherein said step of determining that a first memory area in one of said set of one or more memory segments is associated with said first element of said array further includes the steps of:
detecting if said first memory area has been allocated;
if said first memory area has not been allocated, then performing the steps of;
allocating at least one additional memory segment for containing at least said first memory area;
storing in said segment header memory area data for identifying said at least one additional memory segment.

5. The method of claim 1, wherein said step of determining that said set of one or more memory segments is to be allocated for said array further comprises the steps of:
determining that memory for only a first subset of elements in said plurality of elements is to be currently allocated; and
including in said set of one or more memory segments enough memory segments to allocate memory for said first subset of elements.

6. The method of claim 5, further comprising the steps of:
determining that memory needs to be allocated for a second subset of elements in said plurality of elements, wherein the elements in said second subset of elements are not part of said first subset of elements;
allocating at least one additional memory segment for said second subset of elements;
storing in said segment header memory area data for identifying a set of memory areas in said at least one additional memory segment for storing data associated with said second subset of elements.

7. The method of claim 1, further comprising the steps of:
determining that a first of said set of one or more memory segments is no longer required;
deallocating said first of said set of one or more memory segments;
updating the data stored in said segment header memory area to indicate the deallocation of said first of said set of one or more memory segments.

8. The method of claim 1, further comprising the step of:
detecting said array will be used for storing a particular type of information, wherein said particular type of information is one of information about open cursors, information describing any user data required for the execution of a database statement, and information describing any data to be returned to a user after execution of said database statement.

9. The method of claim 1, wherein said step of determining that said set of one or more memory segments is to be allocated for said array further comprises the steps of:
detecting the number of elements in said plurality of elements;
detecting the size of the elements in said plurality of elements; and
determining a first value representing the number of said plurality of elements on each of said set of one or more memory segments.

10. The method of claim 9, wherein said step of determining said first value is performed by determining how many of said plurality of elements can be located on one of said set of one or more memory segments without requiring the memory segments in said set of one or more memory segments to exceed a predetermined maximum size for memory segments.

11. The method of claim 10, wherein said step of determining that said set of one or more memory segments is to be allocated for said array further comprises the step of:
determining a second value representing the number of said plurality of elements for which memory is to be currently allocated; and
including in said set of one or more memory segments the number of memory segments required for the number of said plurality of elements represented by said second value.

12. A method for accessing data stored in a first element of an array, said method comprising the computer implemented steps of:
accessing data stored in a segment header memory area, wherein the data stored in said segment header memory area identifies a set of one or more memory segments each containing a set of one or more memory areas, wherein each memory area in each said set of one or more memory areas is for storing data associated with a different element in said array, and wherein said set of one or more memory segments is not contiguous;
determining that a first memory area of said set of one or more memory areas is associated with said first element of said array using the data accessed from said segment header memory area; and
accessing said first memory area by reading or writing data to said first memory area.

13. The method of claim 12, wherein said step of determining that a first memory area of said set of one or more memory areas is associated with said first element of said array further includes the steps of:
determining if said first memory area has been allocated;
if said first memory area has not been allocated, then performing the steps of:
allocating at least one additional memory segment for containing at least said first memory area;
storing in said segment header memory area data for identifying said first memory area in said at least one additional memory segment.

14. The method of claim 12, further comprising the step of:
detecting said array is or will be used for storing a particular type of information, wherein said particular type of information is one of information about open cursors, information describing any user data required for the execution of a database statement, and information describing any data to be returned to a user after execution of said database statement.

15. A method for allocating memory in a database system, said method comprising the computer implemented steps of:
detecting that an array is required, wherein said array includes a set of one or more elements;
determining whether a predetermined condition is satisfied;
if said predetermined condition is satisfied, then allocating a contiguous block of memory for the storage of said array; and
if said predetermined condition is not satisfied, then performing the steps of:

allocating a set of one or more memory segments for the storage of said array, wherein said set of one or more memory segments is not contiguous, wherein each of said set of one or more memory segments includes a set of one or more memory areas, and wherein each memory area in each of said sets of one or more memory segments is for storing data associated with a different element of said array; and storing data, wherein said data identifies said set of one or more memory areas in each memory segment of said set of one or more memory segments.

16. The method of claim 15, wherein said step of determining if said predetermined condition is satisfied includes the steps of:

determining that a particular amount of memory is required to store said array;

determining whether said particular amount of memory is greater than a threshold amount of memory;

if said particular amount of memory is not greater than said threshold amount of memory, then said predetermined condition is satisfied; and if said particular amount of memory is greater than said threshold amount of memory, then said predetermined condition is not satisfied.

17. The method of claim 15, wherein said step of determining if said predetermined condition is satisfied includes the steps of:

detecting said array will be used for storing a particular type of information;

determining whether said particular type of information is one of a set of selected types of information;

if said particular type of information is not one of said set of selected types of information, then said predetermined condition is satisfied; and if said particular type of information is one of said set of selected types of information, then said predetermined condition is not satisfied.

\* \* \* \* \*